Aug. 1, 1939.  E. J. WILLIS  2,168,145
PRESSURE GAUGE FOR AUTOMOBILE TIRES
Filed Oct. 6, 1937
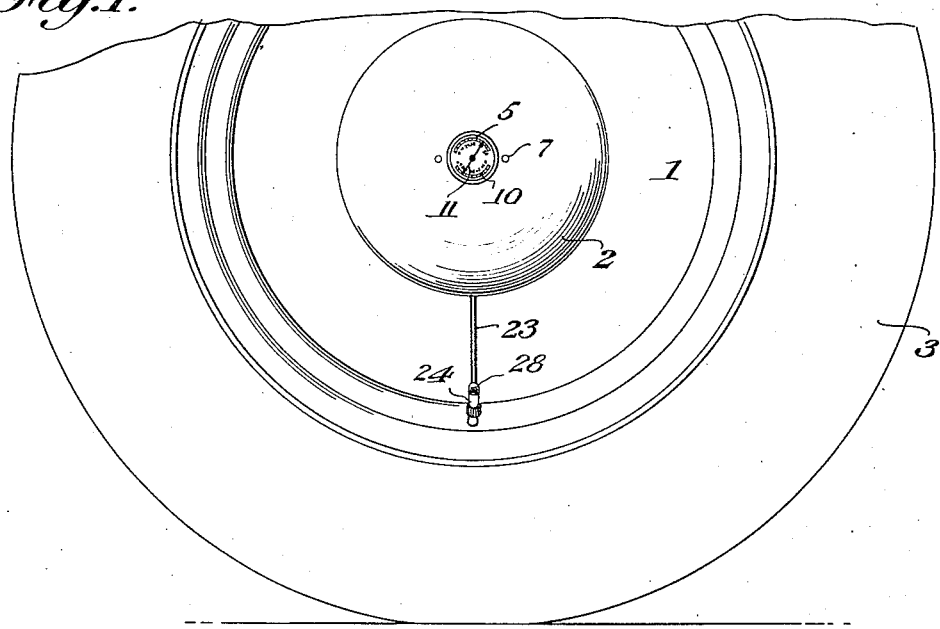
Fig.1.
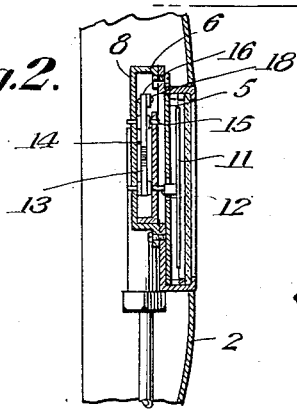
Fig.2.
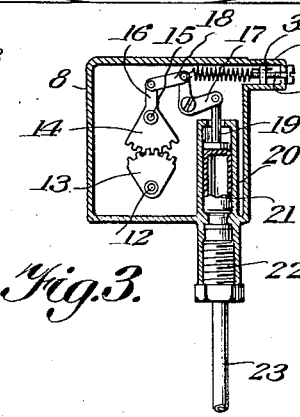
Fig.3.
Fig.4.
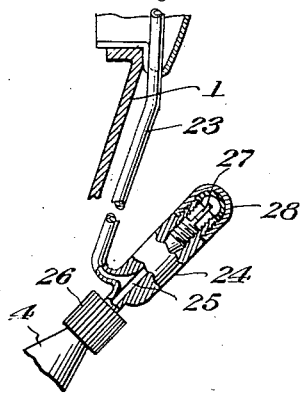
Elijah J. Willis
INVENTOR
BY Victor J. Evans & Co.
ATTORNEYS Patented Aug. 1, 1939

2,168,145

UNITED STATES PATENT OFFICE 2,168,145

PRESSURE GAUGE FOR AUTOMOBILE TIRES

Elijah J. Willis, Morehead City, N. C., assignor of one-half to David E. Oglesby, Farmville, N. C.

Application October 6, 1937, Serial No. 167,652

2 Claims. (Cl. 73—111)

This invention relates to pressure gauges for pneumatic tires of vehicles and has for the primary object the provision of a device of this character which will clearly indicate the pressure of air in the tire and is carried by the hub of the wheel on which the tire is mounted so that a person at any time when the wheel is stationary can determine the approximate air pressure of the tire.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a vehicle wheel and a pneumatic tire equipped with an air pressure gauge constructed in accordance with my invention.

Figure 2 is a fragmentary transverse sectional view showing the pressure gauge mounted in a hub cap of a wheel and equipped with means for connecting the same to an inflating valve of a tire.

Figure 3 is a fragmentary vertical sectional view illustrating the interior structural details of the gauge.

Figure 4 is a fragmentary front elevation illustrating the pressure gauge removed from the cap.

Referring in detail to the drawing, the numeral 1 indicates a fragmentary portion of a vehicle wheel and 2 a removable hub cap. A pneumatic tire 3 is mounted on the wheel 1 and the inflating valve thereof is indicated by the character 4.

The hub cap 2 has an opening for exposing to view a dial 5 of an air pressure gauge 6, the latter being secured on the cap and upon the inside thereof by fasteners 7. The air pressure gauge 6 includes a housing 8 having a portion 9 to support the dial 5 and on which are applied oppositely arranged scales 10 and movable over said scales is an indicator or pointer 11 each end being pointed and movable relative to its respective scale. The scales are of the same graduations but oppositely disposed, the purpose of which is to permit a person when standing facing the wheel 1 to read the scale with the pointer which happens to be positioned most convenient for reading.

The indicator or pointer 11 is secured on a shaft 12 and the latter is journaled in the housing 6 and has secured thereon a segmental gear 13 meshing with another segmental gear 14.

The gear 14 is pivotally mounted in the housing 6, as shown at 15, and has integral therewith an arm 16. A bell crank lever 17 is pivotally mounted in the housing and one end thereof is pivoted to a link 18 which is in turn pivoted on the arm 16. The other end of the bell crank lever 17 is pivoted on a piston 19 operating in a cylinder 20 and engaging an elastic bag 21 located in said cylinder. The cylinder forms an integral part of the housing and extends exteriorly thereof and is internally screw threaded to receive a screw threaded fitting 22. The fitting 22 acts to connect a flexible pipe 23 onto the cylinder and in communication with the interior of the elastic bag 21. The other end of the flexible pipe 23 is connected with a body 24 having a bore 25 and a fitting 26 for connecting the body communicably onto the inflating valve 4 of the pneumatic tire 3. The fitting 26 when connected to the inflating valve unseats the regular valve element thereof so as to place the tire in communication with the bore 25 and the tube 23. A valve element 27 such as commonly used in an inflating valve of a tire is located in the outer end portion of the bore 25 for normally closing the same to the atmosphere. A removable cap 28 is threaded onto the body 24 for protecting the valve element 27 and which may be removed when it is desired to inflate the tire from a conventional source of compressed air.

The housing 8 of the gauge has an offset 29 in which is swiveled an adjusting screw 30 and threaded on said screw and held against rotation is a nut 31. One end of a coil spring is attached to the nut and the other end is atached to the bell crank lever 17 or to the end of the latter which is connected to the link 18. A rib or any other suitable means may be carried by the offset 29 to prevent the nut 31 from rotating but which will permit the nut to slide so that on rotation of the adjusting screw the tension of the spring may be varied. By being able to set the tension of the spring which acts on the bell crank lever permits the gauge to be adjusted for indicating substantially correctly the air pressure within the tire. The air pressure in the tire acting upon the piston 19 imparts movement to the pointer or indicator 11 causing the same to move relative to the scale so that a person at a glance, when the wheel is stationary, may determine approximately the pounds pressure within the tire.

The tube 23 being flexible will permit the hub cap 2 to be removed from the hub of the wheel whenever it is desired and by detaching the body 24 from the inflating valve of the tire the gauge and cap may be fully removed from both the wheel and the tire. By having the adjustment for the spring which acts on the bell crank lever confined within the cap when applied onto the hub of the wheel prevents unauthorized tampering with the indicator.

What is claimed is:

1. An air pressure gauge mountable on a wheel and having an inlet with provision for communicable connection to the inflating valve of a pneumatic tire on the wheel, said gauge comprising a housing having a forward circular dial portion, arcuate scale provision visibly disposed in said dial portion of the housing, a pointer mounted on a shaft whereby to move swingably within the dial portion of the housing in cooperative relation to the scale therein, a toothed sector on said shaft, a correspondingly toothed actuator sector in mesh with said shaft sector, said actuator sector being pivotally mounted in the housing and provided with a medial lever-arm, a hollow cylinder located within the housing laterally from the cooperating toothed sectors with its longitudinal axis parallel to the plane of alinement of the pointer-carrying shaft axis and the axis of said actuator sector, said cylinder being communicable with the inlet of the casing and having a reciprocatory piston therein in opposed relation to the inlet, said piston having an axial stem projected beyond the inner end of the cylinder, a bellcrank pivotally mounted in the housing beyond the inner end of the cylinder and between the cylinder and said actuator sector, one arm of the bellcrank being pivotally attached to the stem portion of said piston, the opposite arm of the bellcrank having a pivotal link connection with the lever arm of said actuator sector, whereby, when the piston is moved toward the inner end of said cylinder under pressure of the air admitted to the cylinders through the inlet, said actuator sector is operated to effect the movement of the pointer in one direction, a spring element normally under tension for moving the actuator sector in an opposite operating direction, said spring element being connected at one end to the end of the bellcrank having the pivotal link connection with the lever arm of said actuator sector, the opposite end of spring element being connected to a nut mounted in a lateral extension of the housing for movement longitudinally and without rotation therein, and an adjusting screw swiveled in said lateral extension and in threaded engagement with said nut whereby the latter is longitudinally adjusted by rotation of the screw and thereby held in its adjusted position.

2. An air pressure gauge of the character described, comprising a housing having a substantially rectangular rear portion and a forward circular dial portion, a dial scale visibly disposed within said dial portion of the housing, a pointer located within the dial portion of the housing and movably mounted in cooperative relation to said dial scale, geared actuating means for said pointer located within the rectangular rear portion of the housing and including a bellcrank actuator, a cylinder located within said rear portion of the housing and communicable with an opening in one wall of the housing for intake of air under pressure, a piston in said cylinder in opposed relation to the air intake opening and having an axial stem projected beyond the inner end of the cylinder, said stem being pivotally attached to one arm of the bellcrank actuator, the housing having a lateral tubular extension beyond the inner end of said cylinder, an adjusting screw swiveled in said lateral tubular extension, a nut threaded on said screw within said extension and movable longitudinally but without rotation therein whereby to be adjusted longitudinally by rotation of the swiveled screw and thereby held in its adjusted position, and a tension spring connected at one end to said nut and at its opposite end to the bellcrank actuator arm opposite to that which is attached to the stem of the piston in said cylinder.

ELIJAH J. WILLIS.